C. M. UPHAM.
WATER SUPPLYING APPARATUS.
APPLICATION FILED FEB. 29, 1916.
1,291,280.
Patented Jan. 14, 1919.
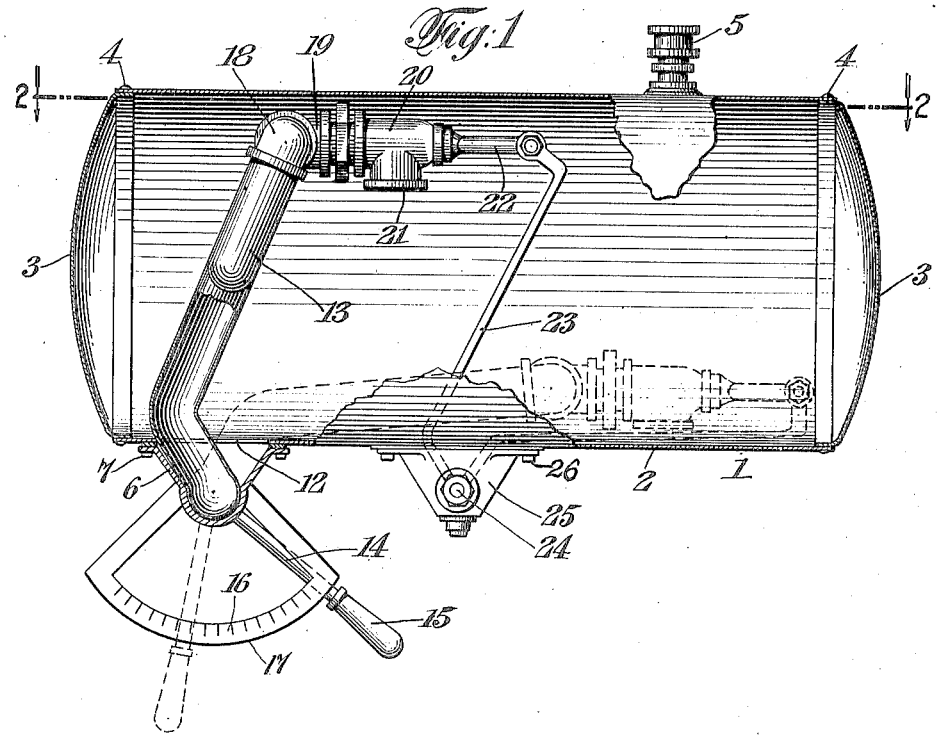
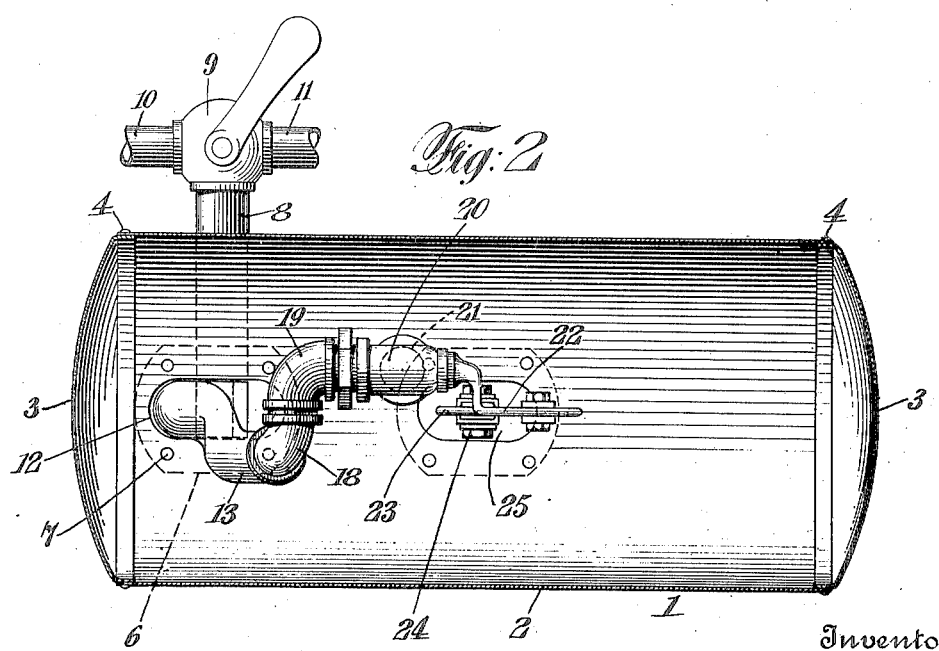
Inventor
Charles M. Upham
By his Attorneys
Brindle, Wright & Small

UNITED STATES PATENT OFFICE.

CHARLES MELVILLE UPHAM, OF STOUGHTON, MASSACHUSETTS, ASSIGNOR OF ONE-HALF TO COLEMAN DU PONT ROAD, INC., OF GEORGETOWN, DELAWARE, A CORPORATION OF DELAWARE.

WATER-SUPPLYING APPARATUS.

1,291,280.

Specification of Letters Patent. Patented Jan. 14, 1919.

Application filed February 29, 1916. Serial No. 81,085.

*To all whom it may concern:*

Be it known that I, CHARLES MELVILLE UPHAM, of Stoughton, in the county of Norfolk, and in the State of Massachusetts, have invented a certain new and useful Improvement in Water-Supplying Apparatus, and do hereby declare that the following is a full, clear, and exact description thereof.

My invention relates particularly to an apparatus designed for supplying water in regulated quantities, and more especially to concrete mixers, although it has general application in the supplying of liquids of any desired character for any desired purpose.

Hitherto devices for supplying water to concrete mixers have been provided with a tiltable pipe to act as the intake and outlet for the water from the supply tank provided for supplying water to the concrete mixer, the said pipe being arranged so that it could be tilted to different positions, so as to act as an intake and outlet respectively in said different positions. It has been found in apparatus of this character, however, that when the pipe is acting as an outlet, as the water approaches the lowest level from which it can be drained by the outlet pipe, there is a continual decrease in the flow of the water, until toward the end when the last quantity of water is being drained off, there is a long continued extremely small flow of water through the outlet pipe. This is due largely to the shape and position of the tilted end of the pipe, acting as an outlet for the water. This provides a very unsatisfactory means for supplying water particularly in concrete mixers where it is desired to provide quickly a measured quantity of water. Furthermore, where there is at the end of the operation of drawing off the water a long continued flow of water in small amounts, it usually happens that the out-flow is cut off during this long continued flow at varying times, thus rendering the amount of water supplied indefinite.

The object of my invention is to provide an apparatus, by means of which a definite quantity of water may be supplied for any desired purpose, but especially in concrete mixers, and so that the long continued flow of water in small quantities toward the end of the operation of drawing off the water from the supply receptacle may be obviated.

While my invention is capable of embodiment in many different forms, for the purpose of illustration I have shown only one form of my invention in the accompanying drawings, in which, Figure 1 is a longitudinal vertical section of an apparatus made in accordance with my invention; and Fig. 2 is a horizontal section of the same taken on line 2/2 of Fig. 1.

In the drawings I have shown a supply tank 1 having a cylindrical body portion 2, and outwardly curved ends 3, which are connected together by rivets 4 in the usual way. An air inlet and outlet valve 5 is provided at the top of the tank 1, said valve 5 also serving to indicate when the tank 1 is filled with water. To the bottom of the tank there is connected a casing 6 by means of rivets 7. A pipe 8 enters the casing 6 at one side thereof, said pipe 8 communicating with a three-way valve 9, which controls the supply to said pipe 8 of water from a pipe 10, and the discharge of the water through the pipe 8 into a pipe 11. The three-way valve 9 is constructed so as to thus convey water into the tank through the pipe 8 from the pipe 10, or discharge the same through the pipe 8 and pipe 11, or to be moved into neutral position so as to prevent the flow of water into the pipe 8. The casing 6 communicates with an opening 12 in the bottom of the tank 1, so as to permit the passage of an adjustable pipe 13 into the tank, the lower end of which pipe 13 is pivotally supported in the bottom of the housing 6, in such a manner as to communicate with the pipe 8. This pipe 13, has at its lower end, furthermore, a lever arm 14 which projects through the housing 6, and which is adapted to be moved by a handle 15 into any desired angular position, the position of the lever 14 being shown by a scale 16 on a segment of a circle 17 which depends from the outside of the housing 6. The upper end of the pipe 13 is connected by right angle pipe couplings 18 and 19 to an intake and outlet nozzle 20 having a downwardly directed horizontal opening 21, the said couplings being rotatably connected. This nozzle 20 carries on its other end a rod 22, which is screw-threaded thereto, said rod 22 being connected by a link 23 to a pivot 24 located in a housing 25 attached to the bottom of the tank 1, by means of rivets 26, a slot 27 being provided for the passage of the link 23 from the tank 1 into the housing 25. It will be noted that the pivot 24 is the same distance from the pivoted end of the rod 22, as the lower pivot of the pipe 13 is from the upper pivotal connection of said pipe with the nozzle 20, and that the distance of the upper pivoted end of the link 23 from the upper pivotal connection of the pipe 13 is the same as the distance of the lower pivotal connection of said pipe 13 from the pivot 24. It will also be noted that the lower pivotal connection of the pipe 13 and the pivot 24 are on the same level.

In the operation of my invention, when it is desired to convey a measured quantity of water from the pipe 11 to any suitable apparatus, as for example, a concrete mixer, the valve 9 is turned so as to admit water from the pipe 10 through the pipe 8 and the pipe 13 and the nozzle 20 into the tank 1. When the tank 1 is completely filled, this will be indicated by the fact that the water has reached the top of the air valve 5. The valve 9 is then turned so as to cut off the water from the pipe 8. The handle 15 is then moved to the desired position along the scale 16, indicating the quantity of water desired to be supplied by the apparatus. The movement of the handle 15 lowers or elevates the nozzle 20 so as to control the quantity of water to be discharged from the tank 1. Such movement of the handle 15 to adjust the elevation of the nozzle 20, however, does not in any way disturb the inclination of the opening 21, but the position of the opening 21, because of the presence of the link 23, remains substantially horizontal. The three-way valve 9 is now turned so as to permit the discharge of water from the tank 1 through the nozzle 20, the pipe 13, the pipe 8, and the pipe 11. Owing to the fact that the opening 21 is in a horizontal position, however, the desired quantity of water will be rapidly drawn off and the supply of water in this manner will quickly cease, as soon as it has reached the low level of the opening 21, as the pipe 13 and nozzle 20 can thereafter no longer operate to draw off the water located below the opening 21. From this it will be seen that the elevation of the nozzle 20 and the opening 21 may be adjusted, as desired, so as to draw off the desired quantity of water, but at all times said nozzle 20 maintains its horizontal position, so as to bring about a rapid flow of water while being discharged from the tank 1, and a sudden and complete termination of the flow of the water when the pre-determined quantity has been supplied.

While I have described my invention above in detail, I wish it to be understood that many changes may be made therein without departing from the spirit of my invention.

I claim:—

1. In combination, a tank and means for drawing off varying quantities of liquid from the same, comprising an adjustable nozzle having an opening adapted to maintain substantially constant angular position, a pipe pivotally connected to one end of the nozzle, and a link connected to the other end of the nozzle.

2. In combination, a tank and means for drawing off varying quantities of liquid from the same, comprising an adjustable nozzle having an opening adapted to maintain substantially constant angular position, and a link connected to one end of the nozzle.

3. In combination, a tank and means for drawing off varying quantities of liquid from the same, comprising an adjustable nozzle having an opening adapted to maintain substantially constant angular position, a pipe pivotally connected to one end of the nozzle, and an adjusting handle connected to said pipe.

4. In combination, a tank and means for drawing off varying quantities of liquid from the same, comprising an adjustable nozzle having an opening adapted to maintain substantially constant angular position, a pipe pivotally connected to one end of the nozzle, a link connected to the other end of the nozzle, and an adjusting handle connected to said pipe.

5. A tank having a horizontal discharge nozzle, a parallel movement mechanism connected to the same, and means for regulating the position of such mechanism.

6. In combination, a tank, a horizontal nozzle therein, a discharge pipe, and a link pivoted to said tank, said discharge pipe and said link being also pivotally connected to said nozzle, and means for moving angularly said discharge pipe.

7. In combination, a tank having a pipe pivotally mounted therein, a nozzle pivoted to said pipe, a link pivoted to said nozzle and tank, and means permitting the intake and discharge of liquid through said pipe.

8. In combination, a tank having a pipe pivotally mounted therein, a nozzle pivoted to said pipe, a link pivoted to said nozzle and tank, means for angularly adjusting said pipe, and means permitting the intake and discharge of liquid through said pipe.

In testimony that I claim the foregoing I have hereunto set my hand.

CHARLES MELVILLE UPHAM.

Witnesses:
 JNO. H. COSBY,
 DANIEL KNOPF.